(12) United States Patent
Nenov et al.

(10) Patent No.: US 7,461,585 B2
(45) Date of Patent: Dec. 9, 2008

(54) PORTABLE ELECTRICAL EXPRESSO MACHINE

(76) Inventors: Chris Nenov, 1876 Painted Bunting Cir., Palm Harbor, FL (US) 34683; Arnold Samreth, 2851 Punta Palma Ct., Holiday, FL (US) 34691; Louis St. Germain, 619 Pelican Dr. South, Oldsmar, FL (US) 34677

( * ) Notice: Subject to any disclaimer, the term of this patent is extended or adjusted under 35 U.S.C. 154(b) by 430 days.

(21) Appl. No.: 11/284,593

(22) Filed: Nov. 22, 2005

(65) Prior Publication Data

US 2006/0107839 A1  May 25, 2006

Related U.S. Application Data

(60) Provisional application No. 60/630,931, filed on Nov. 24, 2004.

(51) Int. Cl.
*A47J 31/00* (2006.01)
*B01D 24/00* (2006.01)

(52) U.S. Cl. .............................. 99/282; 99/280; 99/281; 99/275; 99/323; 99/327; 99/328; 99/333; 99/330; 99/331; 99/332; 99/288; 99/300; 99/304; 99/310; 99/295; 210/473; 210/476; 210/479; 210/480; 210/482

(58) Field of Classification Search ........... 99/280–282, 99/275, 323, 327–333, 288–310, 295; 210/473–482
See application file for complete search history.

(56) References Cited

U.S. PATENT DOCUMENTS 5,309,821 A * 5/1994 Knepler ..................... 99/282
5,440,972 A * 8/1995 English ..................... 99/282

* cited by examiner

*Primary Examiner*—Shawntina Fuqua
(74) *Attorney, Agent, or Firm*—Nields & Lemack

(57) ABSTRACT

A portable hot water dispensing machine, particularly suitable for dispensing espresso, that is compact, lightweight, requires minimal power to operate, and is readily transportable, and a method of dispensing hot water, such as espresso. Two-stage heating is utilized for reducing the boiler volume and power requirements. In addition, components are thermally insulated and are strategically spaced to maximize space and allow for portability.

22 Claims, 2 Drawing Sheets

PORTABLE ELECTRICAL EXPRESSO MACHINE

This application claims priority from Provisional Application Ser. No. 60/630,931 filed Nov. 24, 2004, the disclosure of which is hereby incorporated by reference.

BACKGROUND OF THE INVENTION

The popularity of coffee and espresso drinks has grown recently, and in-home espresso machines are becoming more and more commonplace. These drinks conventionally have been prepared by brewing, where hot water passes through coffee grounds above a filter, under pressure in the case of espresso machines. Indeed, a defining characteristic of electrical espresso machines is that the coffee grinds are infused with hot water under a substantially constant high pressure supplied by an electrical pump. The hot water pressure is usually more than 100 psi throughout the infusion/extraction cycle.

Conventional electrical espresso machines contain the following major components in sequence: a cold water reservoir or direct connection to external cold water supply; a cold water pump; a boiler or thermo-block; a group/brew head; and a portafilter. These components are usually arranged in side-by-side relation. The machines operate as follows. The boiler is filled with water and preheated to a temperature greater than 180° F. prior to activating the pump. During the brewing process, the pump pressurizes the cold water from the water reservoir and injects it into the hot boiler. The pressure from the incoming water forces the hot water already in the boiler into the group or brew head. The hot water than infuses the coffee in the portafilter, and exits into a cup or other receptacle placed under the portafilter.

Typically, espresso machines for home use are larger than about 14 inches high, 10 inches long and 8 inches deep, weigh more than twenty pounds, and require more than 1 kW power to operate. The minimum size and weight of known espresso machines are in part limited by the process sequence described above. For instance, the water is completely unheated before entering the pump, and is heated to the espresso temperature in a single step by the boiler or thermo-block. This requires a large volume of heated water in the boiler, and thus a powerful heater is necessary. Indeed, the water must be heated to about 205° F. in about 20 seconds, which is the optimum brewing time for espresso. Also, for temperature stability, the volume of the boiler is typically at least four times the volume of the prepared coffee, and components such as the boiler, group, and portafilter are typically made of heavy cast brass.

In view of their weight and form, known espresso machines are difficult to transport. Moreover, they cannot be used in passenger vehicles or easily packed for a trip. To be portable, an espresso machine should be lightweight, compact, devoid of protruding parts and should not occupy a large volume. They should be sufficiently sturdy to withstand rough handling. Furthermore, to be usable in a passenger vehicle, an espresso machine should have all of the above characteristics but also should require no more power than that available through a typical vehicle's power outlet, typically 120 W continuous. The machine also should be spill-proof.

SUMMARY OF THE INVENTION

The problems of the prior art have been overcome by the present invention, which provides a portable hot water dispensing machine, particularly suitable for dispensing espresso, that is compact, lightweight, requires minimal power to operate, and is readily transportable. Also provided is a method of dispensing hot water, as well as espresso.

In certain embodiments of the instant machine, two-stage heating is utilized for reducing the boiler volume and power requirements. In addition, components are thermally insulated and are strategically spaced to maximize space and allow for portability. In certain embodiments, the machine can be disassembled in two or more pieces for convenient storage and transportation. The machine also can be used to dispense hot water for beverages other than espresso, such as hot tea or hot chocolate. Preferably the major dimension of the apparatus does not exceed fourteen inches, and preferably the apparatus weighs about ten pounds or less. The required continuous power for operation of the electrical components of the machine preferably does not exceed about 120 W.

DETAILED DESCRIPTION OF THE INVENTION

Figure 1:
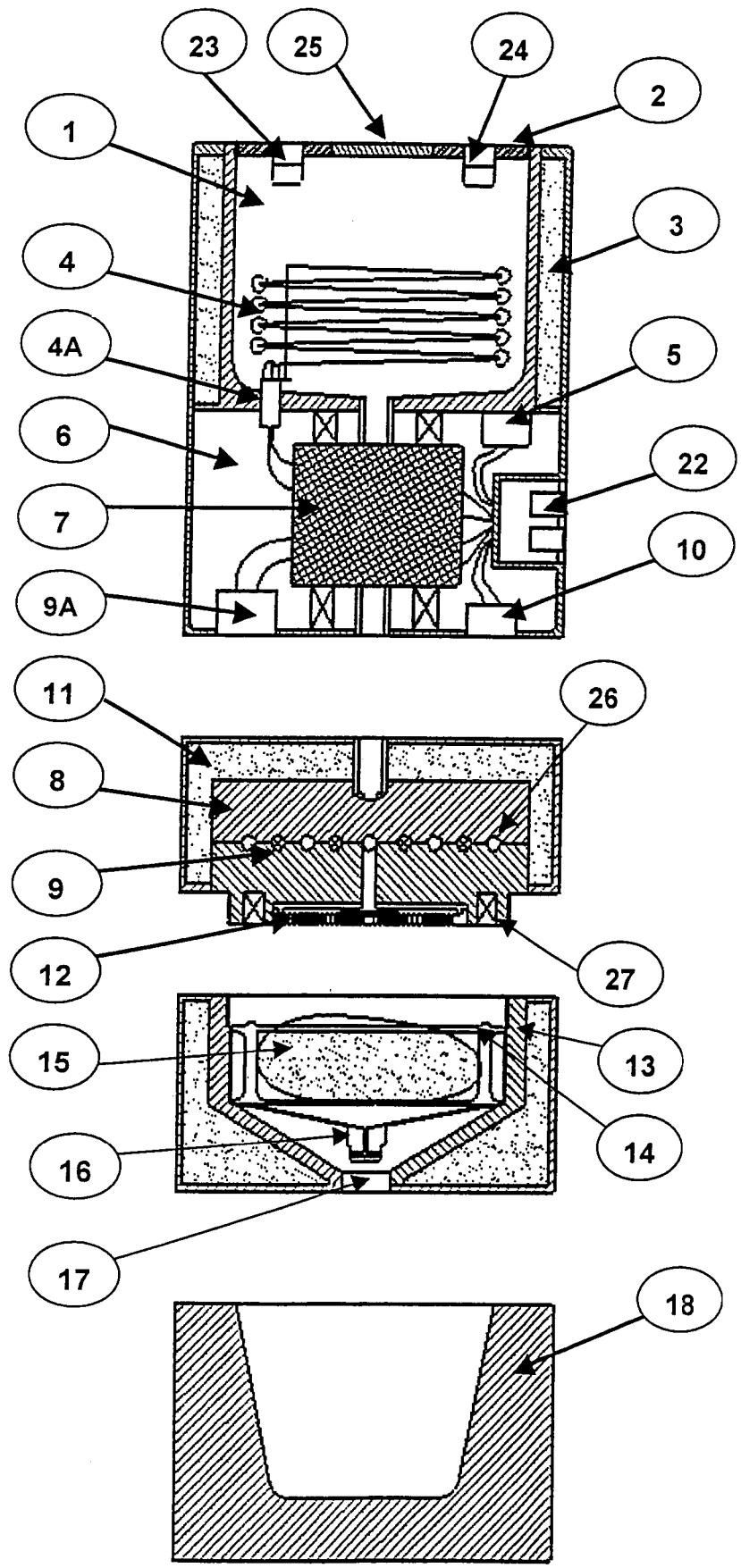
FIG. 1 is a an exploded view of a portable espresso machine in accordance with the present invention.

Turning first to FIG. 1, a vertically stacked espresso machine in accordance with the present invention is shown in an exploded view. Although an espresso machine is illustrated, those skilled in the art will appreciate that the machine can be used to produce hot water for other beverages, such as tea.

The machine includes a reservoir 1 having an open top that is enclosed with a suitable cover 2 that can be secured to the reservoir 1 to close the open top by any suitable means, such as by screwing, latching or with a snap-on fit. Preferably the cover 2 is breathable to prevent pressure from forming during heat-up, and to prevent a vacuum from forming in the reservoir 1 during the pumping operation. The breathable characteristics of the cover 2 can be achieved with a suitable check valve (such as a nylon check valve commercially available from United Plastics Corporation) or membrane, as is known by those skilled in the art. The check valve can be a pressure-relief valve 23 with a differential break pressure of about 1 psi, and/or a vacuum relief check valve also with a differential break pressure of about 1 psi. The check valve can be threaded into the cover 2. Preferably the reservoir 1 is thermally insulated with suitable insulation 3 as shown, and holds a volume sufficient to provide at least one typical espresso drink (about 50 ml) but no more than about 2 typical espresso drinks (about 100 ml).

Positioned in the reservoir 1 is a heater 4 for first-stage heating. The type of heater is not particularly limited, and includes electric heaters capable of generating 100 W, such as the 100 W tubular immersion heaters commercially available from Watlow Electric. Those skilled in the art will appreciate that other suitable heaters can be used, such as conduction heaters, provided they are capable of high temperatures but do not exceed temperature above about 180° F. (which can be due to over-temperature thermostat control). The immersion heater 4 includes a sealed electrical connection 4A. Spaced from reservoir 1 and preferably positioned vertically under the reservoir 1 is electrical compartment 6. The compartment 6 includes pump 7, preferably an electric high-pressure pump (piston type) for supplying a suitable steady water pressure sufficient for making espresso, such as a pressure of about 100 psi or higher. The exterior wall of the machine may have perforations or the like (not shown) in the area of the pump 7 in order to provide cooling of the high-pressure pump. A switching thermostat 5 is attached in intimate contact with the bottom of the electrical reservoir 1 to sense the temperature of the water in the reservoir. Suitable thermostats include snap-disk bimetallic thermostats, or a contact or immersion thermocouple in combination with a temperature control. A suitable on/off temperature point for the thermostat 5 is about 140° F. ±15°. Electrical controls and signal LED's 22 may be provided in compartment 6. Preferably the reservoir 1 and electrical compartment 6 can be assembled to form an integral modular unit.

Figure 3:
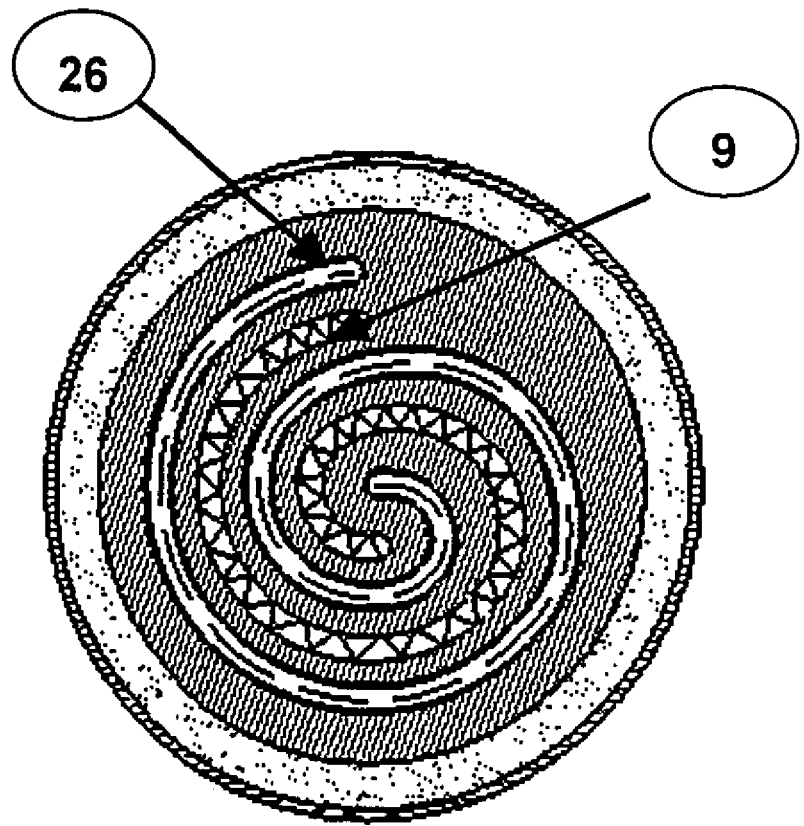
FIG. 3 is a cross-sectional view of a suitable thermo-block that can be used in the machine of the present invention.

Spaced from the compartment 6, preferably vertically, is a pressure-tight thermo-block 8 having a built-in heater 9. Preferably the thermo-block 8 has a water channel 26 (FIG. 3) that spirals, with the heater 9 also provided in a spiral configuration juxtaposed to the spiraling water channel 26. This arrangement is thermally insulated from the outer wall housing the thermo-block with suitable insulation 11, and provides conductive heating of the pressurized pre-heated water (second-stage heating). Preferably the thermo-block 8 is made of a food-grade aluminum alloy. Switching thermostat 10, attached to the top of the thermo-block (and including apportion housed in chamber 6 as shown), senses the temperature of the thermo-block. A suitable on/off temperature for the thermostat 10 is about 210° F. ±15° (the 15 differential reflecting the hysteresis typical of snap disk thermostats). A group or brew head 12 distributes hot pressurized water above the portafilter 13. Preferably the brew head 12 incorporates a water diffuser (shower) plate, and sealing ring 27 for sealing against the portafilter basket 14 discussed below.

Not shown are two over-temperature thermostats, similar to thermostats 5 and 10 but preset to higher temperatures, that provide over-temperature protection to the water reservoir and the thermo-block.

Figure 2:
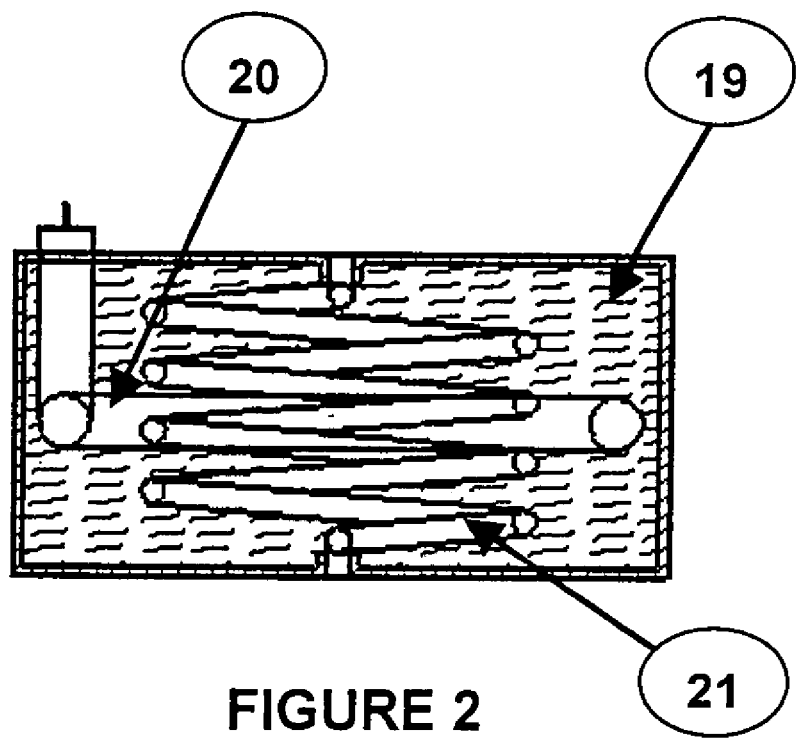
FIG. 2 is a cross-sectional view of an alternate water heater that can be used in the machine of the present invention.

FIG. 2 illustrates an alternative to the thermo-block 8. Thus, a sealed oil-filled heater can be used in order to further reduce the weight and volume of the machine. Prior to activating the pump, the oil 19 in the sealed heater is heated by the heater coil 20 to a temperature higher than the required espresso temperature. The pump then pumps the pre-heated water from the water reservoir into the copper tubing 21, where the pressurized water therein is heated conductively to the required temperature using the heat energy stored in the oil. Oil 19 has higher heat capacity (Cp) than aluminum, therefore it can store more heat energy and, if heated by the immersion heater 20 before activating the pump 7, it can heat up the water passing through the coiled line 21 more efficiently and quickly, with a better water temperature control, and with less additional energy than are required of the thermo-block 8.

A portafilter basket 14 sits in the portafilter 13 and holds the beverage material from which flavor is to be extracted such as by brewing, such as ground coffee in the form of loose tampered grinds, pods 15 or capsules; tea leaves which can be ground; beverage powders such as cocoa powder; etc. The basket 14 can be pressurized (as shown) or non-pressurized. Preferably the basket 14 includes a crema nozzle 16 as shown. The nozzle 16 can be permanent or changeable for use with the pressurized basket. Different nozzles may be used with different coffee types, containers, and grind size in order to produce optimum results, which generally requires an infusion time (the time during which the pressurized hot water and the coffee grinds are in contact with each other) of 20-25 seconds. The portafilter 13 can be frusto-conical in shape, and includes an optional nozzle or spigot 17 for the dispensing of the liquid beverage into a suitable receptacle 18 such as a coffee cup without splashing and loss of crema. It is preferably located vertically below the thermo-block 8 and brew head 12, which in turn is preferably positioned vertically below the electrical chamber 6.

Alternatively, in order to reduce the number of components, the basket function can be integrated within the portafilter. Also, the crema nozzle, if present, may be assembled to or integrated within the portafilter. When there is no power restriction, the thermo-block heater 8 can be powerful enough to raise the water temperature to above 250° F. and produce steam such as for milk-based espresso drinks.

Preferably the heaters, pump, brew head and portafilter are arranged in one or more housings with perimeters that are vertically aligned in order to provide a compact machine. The machine can be modular, and thus disassembled in two or more locations and quickly reassembled prior to use. Preferably the outer housings are made of a lightweight material, such as plastic or aluminum.

In operation, the beverage material such as coffee is placed in the portafilter basket 14. Ground coffee may be placed directly in the basket 14, or a prepackaged coffee pod 15 or a coffee capsule may be used, for example. Cold water is introduced into the reservoir 1 through the open top, and cover 2 is used to close the top of reservoir 1. The water in the reservoir 1 is then preheated by the heater 4 to a suitable temperature compatible with the inlet temperature of the pump 7, but preferably not exceeding 150° F., in order to prevent hot-water scalding and excessive steam buildup. A suitable temperature range is from about 130° F. to about 150° F., most preferably about 140° F.

Where power is not a restriction, the thermo-block 8 may be preheated simultaneously with the heating of the water in reservoir 1. Once the water preheat temperature has been reached as sensed by the thermostat 5, the brew process is activated, such as by a user-operated switch (not shown) or automatically in response to the sensed temperature. The heater 4 can be turned off, and the pump 7 activated to pump water into the pre-heated thermo-block 8. Where power is restricted (such as in vehicle-portable machines), the thermo-block 8 may be heated prior to, or after, preheating the cold water in the reservoir 1 but before activating pump 7. Similarly, depending on the power restriction, the thermo-block heater 9 can be left on during the brew process, or can be turned off after preheating the thermo-block 8 and before the pump 7 has been turned on.

In the embodiment of FIG. 1, the pre-heated water from the reservoir 1 enters the pre-heated thermo-block 8, preferably near the perimeter in order to maintain the outside wall temperature relatively low, and spirals toward the center of the thermo-block. The water is heated to a suitable temperature by the thermo-block 8, preferably in the range of about 190° F. to about 220° F., most preferably about 205° F., before entering the group or brew head 12. In order to minimize or prevent the temperature of the water from falling upon entering the group or brew head 12, the group or brew head 12 may be part of, or in intimate thermal contact with, the thermo-block 8 to allow for conductive heat transfer and temperature uniformity. The group or brew head 12 preferably holds the portafilter 13 and basket 14 and distributes the hot pressurized water over the beverage material for extraction. Optimum brewing time is from about 20 to about 25 seconds, and optimum infusion temperature (the temperature at which the water makes contact with the beverage material) is about 205° F. The resulting beverage, such as espresso, flows through the portafilter spout 17 and into a suitable receptacle, such as a spill-proof insulated cup 18 that is removably attached to the machine.

For optimum espresso quality over a range of coffee types and grind sizes, as well as for preparation of a wide variety of other hot drinks, the basket 14 may be pressurized by means of a removable cream nozzle 16 having an opening with a fixed or variable cross-section to accommodate various sized beverage materials such as coffee grinds.

In the event the machine is used for beverages other than espresso, suitable flavoring or other material (such as tea leaves) is placed in the portafilter. If the machine is used simply to dispense hot water, the portafilter can be left empty, or the brew head and/or portafilter can be completely removed from the apparatus.

What is claimed is:

1. Apparatus for dispensing hot water, comprising:
   a water reservoir;
   a first heater for heating water in said reservoir to a first temperature;
   a second heater for heating water from said reservoir to a second temperature higher than said first temperature;
   a water pump having an inlet in fluid communication with said water reservoir and an outlet in fluid communication with said second heater, said pump positioned to pump said water in said water reservoir heated by said first heater directly to said second heater; and
   a dispenser for dispensing the heated water.

2. The apparatus of claim 1, further comprising a brew head and a portafilter, and wherein said portafilter is adapted to hold beverage material.

3. The apparatus of claim 1, wherein said beverage material is coffee.

4. The apparatus of claim 3, wherein said coffee is in the form of beans, grinds, pods or capsules.

5. The apparatus of claim 1, wherein said first heater is adapted to heat said water to a temperature of about 140° F.

6. The apparatus of claim 1, wherein said second heater is adapted to heat said water to a temperature of about 205° F.

7. The apparatus of claim 2, wherein said second heater is a thermo-block, and wherein said brew head is integrated into said thermo-block.

8. The apparatus of claim 2, wherein said second heater is an oil-filled heater.

9. The apparatus of claim 1, wherein said first heater, said pump and said second heater are vertically aligned.

10. The apparatus of claim 2, wherein said first heater, said pump, said second heater are arranged in housings with perimeters that are vertically aligned.

11. The apparatus of claim 7, wherein said thermoblock comprises a spirally water channel.

12. The apparatus of claim 2, wherein the water heated to said second temperature contacts said beverage material for about 20 seconds.

13. A method for preparing hot liquid, comprising:
    providing a water reservoir;
    heating water in said water reservoir with said first heater to a first temperature;
    providing a second heater;
    providing a fluid path from said water reservoir to said second heater via a pump;
    pumping said heated water to said second heater;
    heating said pumped water with said second heater to a second temperature higher than said first temperature; and
    dispensing the resulting heated water.

14. The method of claim 13, further comprising providing a beverage material, and contacting said beverage material with said water heated by said second heater.

15. The method of claim 14, wherein said beverage material is coffee.

16. The method of claim 15, wherein said coffee is in the form of beans, grinds, pods or capsules.

17. The method of claim 14, wherein said beverage material is contacted with said heated water after passing through a brew head.

18. The method of claim 13, further comprising sensing the temperature of said heated water in said reservoir, and commencing said pumping operation in response to said sensed temperature when said sensed temperature reaches said first temperature.

19. The method of claim 14, where said water is in contact with said beverage material for about 20 seconds.

20. The method of claim 16, wherein said dispensed water is espresso.

21. The apparatus of claim 1, wherein said pump pumps said water under a pressure of about 100 psi.

22. The method of claim 13, wherein said pump pumps said water under a pressure of about 100 psi.

\* \* \* \* \*